US 8,414,861 B2

(12) United States Patent
Jeong et al.

(10) Patent No.: US 8,414,861 B2
(45) Date of Patent: Apr. 9, 2013

(54) CARBONIZED CELLULOSE MATERIAL HAVING GRAPHITE NANOLAYER AND SYNTHESIS METHOD THEREOF

(75) Inventors: Nam Jo Jeong, Daejeon (KR); Seong Ok Han, Daejeon (KR); Hong Soo Kim, Daejeon (KR); Hee Yeon Kim, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 813 days.

(21) Appl. No.: 12/276,301

(22) Filed: Nov. 21, 2008

(65) Prior Publication Data

US 2009/0246511 A1    Oct. 1, 2009

(30) Foreign Application Priority Data

Mar. 25, 2008 (KR) ................. 10-2008-0027460

(51) Int. Cl.
*D01F 9/16* (2006.01)

(52) U.S. Cl. .................................. 423/447.9

(58) Field of Classification Search ..... 423/447.8–447.9
See application file for complete search history.

(56) References Cited

U.S. PATENT DOCUMENTS

| | | | | |
|---|---|---|---|---|
| 3,179,605 | A * | 4/1965 | Ohsol | 423/447.4 |
| 3,699,210 | A * | 10/1972 | Binning et al. | 423/447.8 |
| 4,670,300 | A * | 6/1987 | Stewart, Jr. | 427/115 |

FOREIGN PATENT DOCUMENTS

| | | |
|---|---|---|
| DE | 1234608 B | 2/1967 |
| GB | 1193079 A | 5/1970 |

OTHER PUBLICATIONS

Duward F. Shriver & Peter Adkins, Inorganic Chemistry p. 361-364 (3d. ed, W.H. Freeman and Company 1999).*
Definition of "carbide," accessed online at http://www.merriam-webster.com/dictionary/carbide on Dec. 12, 2012.*
Yutaka Kaburagi et al., "Thin graphite skin on glass-like carbon fiber prepared at high temperature from cellulose fiber", Science Direct, Letters to the Editor / Carbon 43, pp. 2817-2819, Elsevier Ltd., Available online Jul. 12, 2005.
Dae-Young Kim et al., "Graphitization of highly crystalline cellulose", Carbon, Jun. 2001, vol. 39, No. 7, pp. 1051-1056, Elsevier Science Ltd., Tokyo, Japan.

* cited by examiner

*Primary Examiner* — Daniel C McCracken
(74) *Attorney, Agent, or Firm* — LRK Patent Law Firm

(57) ABSTRACT

Disclosed herein is a carbonized cellulose material having a graphite nanosized surface layer directly carbonized from a cellulose fiber, and a method of synthesizing a carbonized cellulose material having a graphite nanolayer on a surface thereof, including: i) heating a cellulose fiber in a reactor; ii) forming a primary carbonized cellulose while maintaining temperature of the reactor; iii) cooling the formed primary carbonized cellulose; iv) heating the cooled primary carbonized cellulose; v) forming a secondary carbonized cellulose while maintaining temperature of the reactor; vi) cooling the formed secondary carbonized cellulose.

13 Claims, 4 Drawing Sheets

CARBONIZED CELLULOSE MATERIAL HAVING GRAPHITE NANOLAYER AND SYNTHESIS METHOD THEREOF

CROSS-REFERENCE TO RELATED APPLICATION

The benefit of priority is claimed to Republic of Korea patent application number 10-2008-0027460, filed Mar. 25, 2008, which is incorporated by reference herein.

BACKGROUND

1. Introduction

The present discussion relates to a carbonized cellulose material having a graphite nanolayer on the surface thereof and a method of synthesizing the same, and, more particularly, to a carbonized cellulose material having a graphite nanolayer directly carbonized from cellulose fiber and a method of synthesizing the same.

2. Related Art

Recently, research into biomaterials such as seaweeds, forest products and the like has been actively conducted, and, particularly, attempts have been made to practically use the biomaterials in advanced new material development technologies, in which environmental, energy and nanotechnologies (NT) are combined with each other.

Typical examples of technologies using biomaterials may include technologies of synthesizing bioethanol using cellulose fiber such as corn and technologies of synthesizing a polymer-natural fiber composite material, using the biomaterials.

In particular, unlike conventional carbon-carbon composite materials and glass fiber-carbon composite materials, since the composite materials synthesized using biomaterials can be used to produce high-performance environment-friendly composite materiels, many countries have made efforts to develop technologies related to the synthesis of composite materials using biomaterials. Recently, research into preparing nanosized cellulose fiber and then using the nanosized cellulose fiber as a composite material has been actively conducted.

Such technologies of synthesizing a composite material using natural cellulose can be practically used in various fields such as materials for electrodes and batteries, adsorbents of harmful substances, materials for producing hydrogen, and the like.

However, conventional research on carbon composite materials using cellulose, disclosed in Korean Patent Registration Nos. 0610888 and 0852690, is problematic in that the carbon composite materials are prepared through complicated processes, such as a process of heat-treating cellulose with carbon precursors, for example, carbon nanotubes, a process of mixing cellulose with additional materials, for example metals and alcohols, and a process of pre-treating cellulose, thereby decreasing efficiency.

In order to overcome the above problems, Korean Patent Registration Nos. 0485603 and 0666276 disclose methods of synthesizing carbonized material by directly carbonizing cellulose. However, these methods are also problematic in that an additional mixing and pre-treating process is required, and in that the original cellulose structure is destroyed or amorphous carbonized material are obtained. Therefore, there are difficulties in obtaining graphite nanostructured carbonized materials having high crystallinity.

SUMMARY

Therefore, hereupon, the present inventors developed a graphite nanostructured carbonized material having high crystallinity by directly inactivating and carbonizing cellulose secondarily while minimizing the loss of the original cellulose fiber structure without performing an additional mixing or pre-treating process.

Accordingly, the present invention has been made keeping in mind the above problems occurring in the prior art, and an object of the present invention is to provide a carbonized cellulose material in which a very thin graphite layer is directly formed on the surface of a carbonized cellulose in order to conveniently produce a novel structured carbonized material having various uses from a natural cellulose fiber.

Another object of the present invention is to provide a carbonized cellulose material having improved mechanical and electrical properties, produced by applying a novel structured carbonized graphite, which can be used even in a high-temperature environment, on a cellulose fiber and thus forming a uniform graphite layer on the surface thereof while minimizing the loss of the original cellulose fiber structure.

A further object of the present invention is to provide a method of synthesizing a carbonized cellulose material by directly forming a very thin graphite layer on the surface of a primarily heat-treated carbonized cellulose through a secondary heat-treating process in order to conveniently produce a novel structured carbonized material having various uses from a natural cellulose fiber.

A still further object of the present invention is to provide a method of synthesizing a carbonized cellulose material having improved mechanical and electrical properties by forming a uniform graphite layer on the surface of a carbonized cellulose obtained while minimizing the loss of a original cellulose fiber structure in order to obtain a novel structured carbonized graphite which can be used even in a high-temperature environment.

In order to accomplish the above objects, an aspect of the present invention provides a carbonized cellulose material having a graphite nanosized surface layer directly carbonized from a cellulose fiber.

Further, in order to accomplish the above objects, another aspect of the present invention provides a method of synthesizing a carbonized cellulose material having a graphite nanolayer on a surface thereof, including: i) heating a cellulose fiber in a reactor; ii) forming primary carbonized cellulose while maintaining temperature of the reactor; iii) cooling the formed primary carbonized cellulose; iv) heating the cooled primary carbonized cellulose.; v) forming a secondary carbonized cellulose while maintaining temperature of the reactor; vi) cooling the formed secondary carbonized cellulose.

In the method, the i) heating of the cellulose fiber in the reactor is performed at a heating rate of 5~12.5° C./min under a 100% hydrogen atmosphere.

Further, the ii) forming of the primary carbonized cellulose is performed at a temperature of 1500° C. for 1~2 hours under a 100% hydrogen atmosphere.

Further, the iii) cooling of the primary carbonized cellulose includes: a) cooling the primary carbonized cellulose to a temperature of 200° C. under a 100% hydrogen atmosphere; and b) cooling the primary carbonized cellulose to room temperature under a 100% nitrogen atmosphere.

Further, the iv) heating of the primary carbonized cellulose is performed at a heating rate of 5~12.5° C./min under a 100% argon atmosphere.

Further, the v) forming of the secondary carbonized cellulose is performed at a temperature of 2200° C. for 5~10 hours under a 100% argon atmosphere.

Further, the vi) cooling of the secondary carbonized cellulose is performed to room temperature under a 100% argon atmosphere.

Further, the method further includes, before the i) heating of the cellulose or the iv) heating of the primary carbonized cellulose, operating a vacuum pump for 30 minutes to remove oxygen.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Hereinafter, example embodiments are described in detail with reference to the attached drawings.

Figure 1:
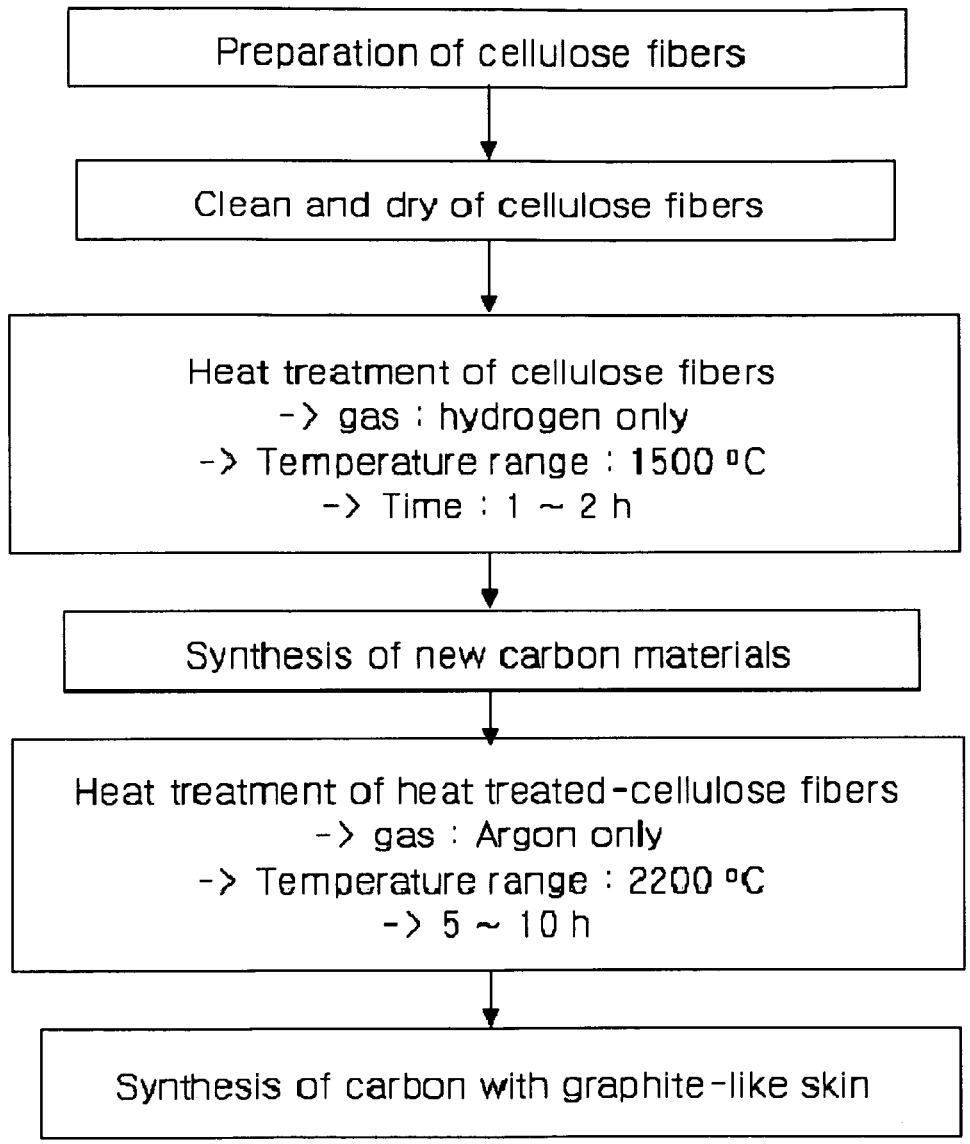
FIG. 1 is a flowchart showing a method of synthesizing carbonized cellulose having a graphite nanolayer on the surface thereof through the high-temperature multi-step heat-treatment of a cellulose fiber according to the present invention.

FIG. 1 is a flowchart showing a method of synthesizing secondary carbonized cellulose having a graphite nanolayer on the surface thereof by forming primary carbonized cellulose through the high-temperature heat-treatment of a cellulose fiber and then secondarily heat-treating the primary carbonized cellulose at high temperature.

The method roughly includes the steps of: providing a cellulose fiber, washing the cellulose fiber, primarily heat-treating the cellulose fiber at high temperature to form a primary carbonized cellulose, cooling the primary carbonized cellulose, secondarily heat-treating the primary carbonized cellulose at high temperature to form a secondary carbonized cellulose, and cooling the secondary carbonized cellulose.

The method is specifically described as follows. First, in order to form carbonized cellulose having a graphite nanolayer on the surface thereof, a cellulose fiber is required. The cellulose fiber has a size of 100~200 µm and is of a variety of shapes.

The provided cellulose fiber is washed with distilled water, and then dried at room temperature.

Subsequently, the dried cellulose fiber is put into a high-purity alumina or carbon crucible and than introduced into a high-temperature reactor, and then a vacuum pump is operated for 30 minutes to remove oxygen from the reactor.

Subsequently, the reactor is heated to the heat treatment temperature. In this case, the reactor is heated to a temperature of 1500° C. from room temperature at a heating rate of 5~12.5° C./min.

100% hydrogen is supplied to the reactor from the time of the room temperature, and the temperature of the reactor reaches the heat treatment temperature followed by cooling.

While the temperature is lowered from 200° C. to the room temperature, the hydrogen is replaced with nitrogen. In this case, the amount of atmosphere gas (hydrogen) is not changed until the reaction is completed.

The reactor is heated to the heat treatment temperature, maintained for 1~2 hours, and then slowly cooled.

Thus, primary carbonized cellulose having a novel structure is prepared from cellulose fiber.

Various cellulose microfibers may be used as the cellulose fiber heat-treated at high temperature.

In the present invention, preferably, henequen, kenaf, or setaria virids are used as the cellulose microfiber.

Thereafter, the cooled primary carbonized cellulose is put into a high-temperature tungsten crucible and then introduced into the high-temperature reactor. Further, the vacuum pump is operated to remove oxygen from the reactor again.

Subsequently, the reactor is heated to the heat treatment temperature. In this case, the reactor is heated to a temperature of 2200° C. at a heating rate of 5~12.5° C./min.

100% argon is supplied to the reactor from the time of the room temperature, and the amount of atmosphere gas (hydrogen) is not changed until the reaction is completed.

The reactor is heated to the desired temperature, maintained for 5~10 hours, and then slowly cooled.

Thus, secondary carbonized cellulose having a graphite nanolayer on the surface thereof is prepared from the primary carbonized cellulose having a novel structure. In this case, the graphite nanolayer has a depth of about 50~100 nm.

Hereinafter, the present discussion will be described in more detail with reference to the following Examples.

EXAMPLE 1

Figure 2:
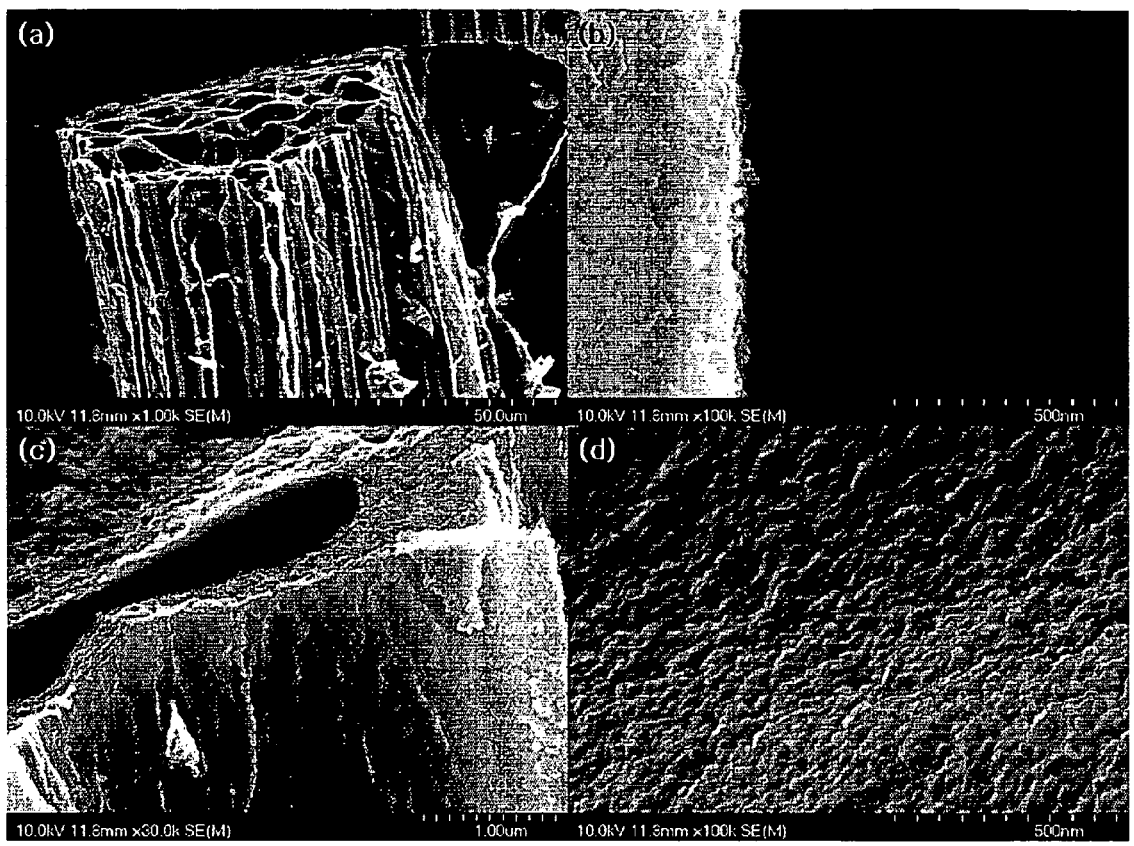
FIG. 2 is of photographs showing the scanning electron microscope (SEM) images of novel structured carbonized cellulose obtained through the high-temperature multi-step heat-treatment of a cellulose fiber according to the present invention.

FIG. 2 shows the scanning electron microscope (SEM) images of novel structured carbonized cellulose obtained through the high-temperature multi-step heat-treatment of a cellulose fiber according to the present invention. The sample used in the experiment was a henequen microfiber. Here, the primary heat treatment temperature was 1500° C., the secondary heat treatment temperature was 2200° C., and primary and secondary reaction times were 1 and 6 hours, respectively.

FIG. 2A shows the body of the final heat-treated sample. From FIG. 2A, it can be seen that a microtubule structure and a surface layer, which can be observed in a henequen sample, were not seriously damaged.

FIG. 2B shows the lateral surface of the body of the carbonized henequene. From FIG. 2B, it can be seen that a coarse and irregular nanolayer was observed.

This coarse and irregular nanolayer was also observed in FIG. 2C and FIG. 2D showing the top surface of a microtubule of henequene.

EXAMPLE 2

Figure 3:
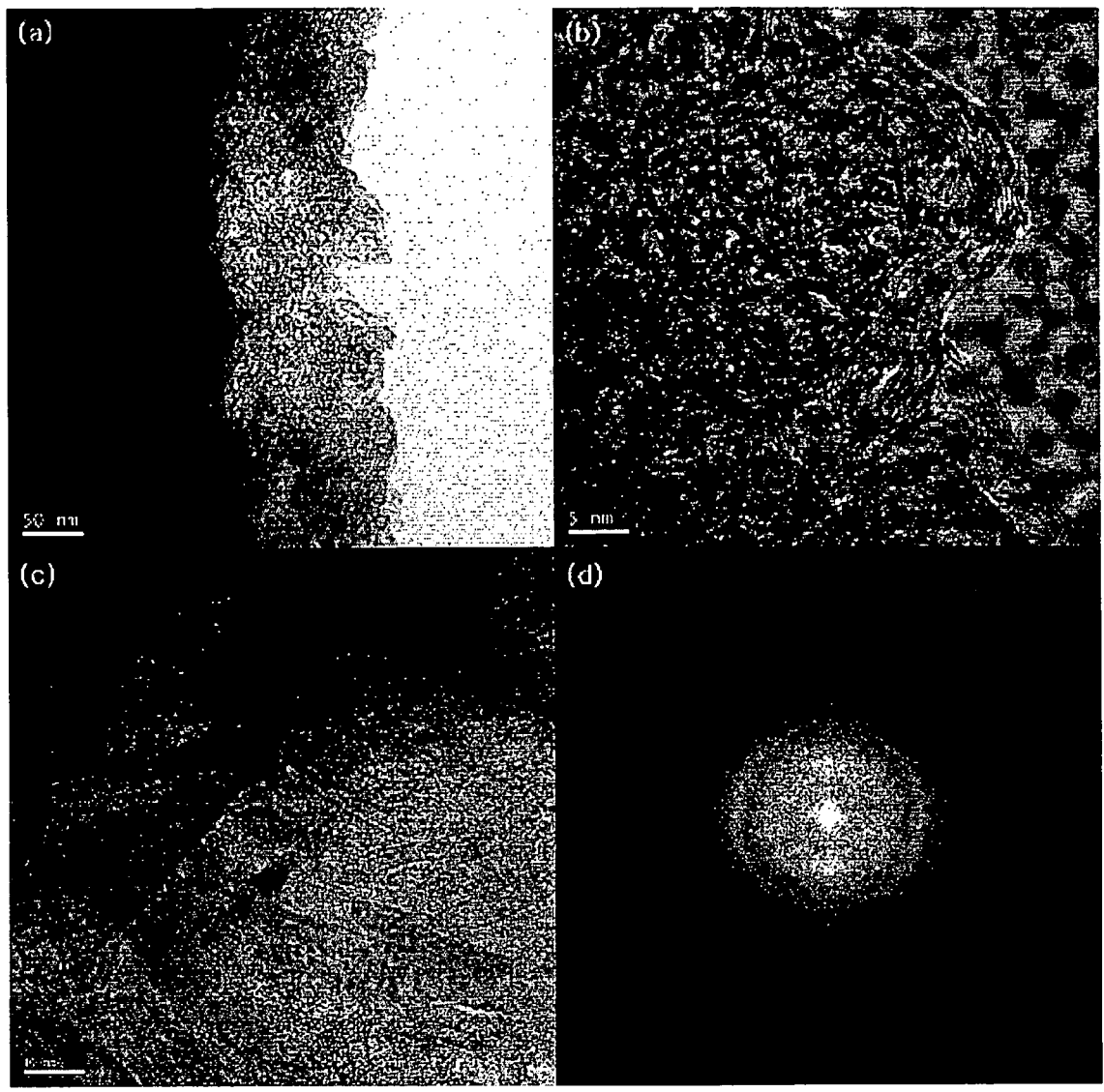
FIG. 3 is of photographs showing the transmission electron microscope (TEM) images of novel structured carbonized cellulose obtained through the high-temperature multi-step heat-treatment of a cellulose fiber according to the present invention.

FIG. 3 shows the transmission electron microscope (TEM) images of novel structured carbonized cellulose obtained through the high-temperature multi-step heat-treatment of a cellulose fiber according to the present invention.

FIG. 3A shows the surface of the carbonized henequene cellulose fiber. In FIG. 3A, the dark portion shows the body of the henequene cellulose fiber, and the light portion shows a graphite nanolayer formed on the surface of the henequene. It was found that the thickness of the graphite nanolayer is about 50~100 nm.

FIGS. 3B and 3C show the high-power TEM images of a part of the surface of the carbonized henequene cellulose fiber shown in FIG. 3A. From FIGS. 3B and 3C, it can be seen that carbon layers having high crystallinity were observed, and the interplanar spacing therebetween was 0.3399 nm. It is evaluated that the interplanar spacing between the carbon layers is very similar to the interplanar spacing (0.3348 nm) of graphite. FIG. 3D shows the XRD pattern of the graphite nanolayer. In FIG. 3D, many dots are observed in the portion corresponding to the interplanar spacing of graphite.

EXAMPLE 3

Figure 4:
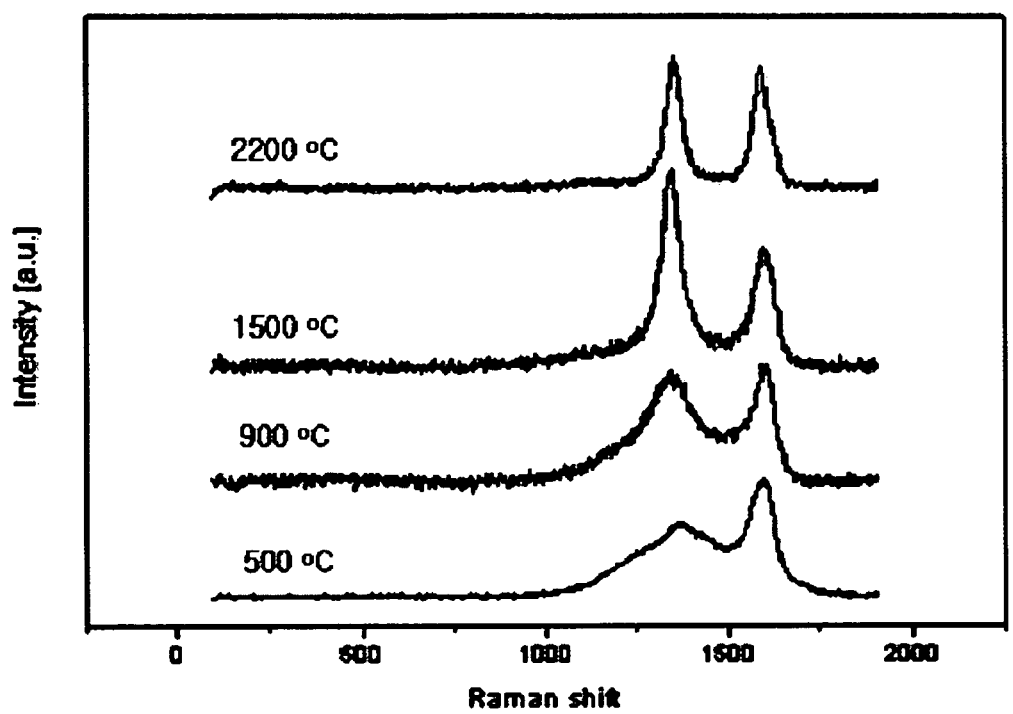
FIG. 4 is a graph showing the results of Raman analysis of novel structured carbonized cellulose obtained through the high-temperature multi-step heat-treatment of a cellulose fiber according to the present invention.

FIG. 4 shows the results of Raman analysis of novel structured carbonized cellulose obtained through the high-temperature multi-step heat-treatment of a cellulose fiber according to the present invention.

From FIG. 4, it can be seen that the shape of the Raman graph is greatly changed depending on the increase in heat treatment temperature of the sample. When the heat treatment temperature of the sample was 500 or 900° C., the shape of the D-line peak of the sample was similar to that of amorphous carbon. However, when the heat treatment temperature of the sample was 1500° C., the shape of the D-line peak of the sample was slightly different from that of amorphous carbon. Meanwhile, a cellulose sample heat-treated at 2200° C. showed a Roman peak shape observed in multi-walled carbon nanotubes. Further, the ratio of D-line peak to G-line peak at 2200° C. was also greatly improved compared to that at 1500° C.

The present invention provides a biomaterial used and researched in various fields, and, particularly, provides a novel structured carbon support produced by directly forming a graphite nanolayer on the surface of the cellulose fiber through the two-step heat treatment of the cellulose fiber. The carbon composite of the present invention is advantageous in that the loss of the original cellulose fiber can be minimized, and that novel carbonized cellulose having excellent electrical, physical and chemical properties, such as high crystallinity, good electroconductivity, large specific surface area and high mechanical strength, can be synthesized.

Further, the carbonized cellulose material of the present invention can be used as a material for electrodes for secondary cells, fuel cells and the like, and can be utilized for high-performance gas sensors and reaction materials as a catalyst support.

In particular, since the carbonized cellulose material of the present invention has excellent properties as a catalyst support, it is predicted that it will be used in high-temperature reduction reaction apparatuses. Further, the carbonized cellulose material of the present invention is expected to be applied to an agent for treating harmful matter, and thus it has far-reaching influence on industry.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of synthesizing a carbonized cellulose material having a graphite nanolayer on a surface thereof, comprising:
    i) heating a cellulose fiber in a reactor;
    ii) forming primary carbonized cellulose while maintaining temperature of the reactor;
    iii) cooling the formed primary carbonized cellulose;
    iv) heating the cooled primary carbonized cellulose;
    v) forming a secondary carbonized cellulose while maintaining temperature of the reactor; and,
    vi) cooling the formed secondary carbonized cellulose,
    wherein the graphite nanolayer is made from the primary carbonized cellulose through the consecutive heating and cooling of the primary carbonized cellulose, and
    wherein the iii) cooling of the primary carbonized cellulose comprises:
        a) cooling the primary carbonized cellulose to a temperature of 200° C. under a 100% hydrogen atmosphere; and
        b) cooling the primary carbonized cellulose to room temperature under a 100% nitrogen atmosphere.

2. The method of synthesizing a carbonized cellulose material having a graphite nanolayer on a surface thereof according to claim 1, wherein the i) heating of the cellulose fiber in the reactor is performed under a 100% hydrogen atmosphere.

3. The method of synthesizing a carbonized cellulose material having a graphite nanolayer on a surface thereof according to claim 1, wherein the i) heating of the cellulose fiber in the reactor is performed at a heating rate of 5~12.5° C./min.

4. The method of synthesizing a carbonized cellulose material having a graphite nanolayer on a surface thereof according to claim 1, wherein the ii) forming of the primary carbonized cellulose is performed under a 100% hydrogen atmosphere.

5. The method of synthesizing a carbonized cellulose material having a graphite nanolayer on a surface thereof according to claim 1, wherein the ii) forming of the primary carbonized cellulose is performed at a temperature of 1500° C.

6. The method of synthesizing a carbonized cellulose material having a graphite nanolayer on a surface thereof according to claim 1, wherein the ii) forming of the primary carbonized cellulose is performed for 1~2 hours.

7. The method of synthesizing a carbonized cellulose material having a graphite nanolayer on a surface thereof according to claim 1, wherein the iv) heating of the primary carbonized cellulose is performed under a 100% argon atmosphere.

8. The method of synthesizing a carbonized cellulose material having a graphite nanolayer on a surface thereof according to claim 1, wherein the iv) heating of the primary carbonized cellulose is performed at a heating rate of 5~12.5° C./min.

9. The method of synthesizing a carbonized cellulose material having a graphite nanolayer on a surface thereof according to claim 1, wherein the v) forming of the secondary carbonized cellulose is performed under a 100% argon atmosphere.

10. The method of synthesizing a carbonized cellulose material having a graphite nanolayer on a surface thereof according to claim 1, wherein the v) forming of the secondary carbonized cellulose is performed at a temperature of 2200° C.

11. The method of synthesizing a carbonized cellulose material having a graphite nanolayer on a surface thereof according to claim 1, wherein the v) forming of the secondary carbonized cellulose is performed for 5~10 hours.

12. The method of synthesizing a carbonized cellulose material having a graphite nanolayer on a surface thereof according to claim 1, wherein the vi) cooling of the secondary carbonized cellulose is performed to room temperature under a 100% argon atmosphere.

13. The method of synthesizing a carbonized cellulose material having a graphite nanolayer on a surface thereof according to claim 1, further comprising, before the i) heating of the cellulose or the iv) heating of the primary carbonized cellulose:

operating a vacuum pump for 30 minutes to remove oxygen.

* * * * *